3,836,655
PRESERVATIVE COMPOSITION FOR
MOIST GRAIN
Daniel L. Kensler, Jr., West Des Moines, and David D. Walgenbach, Des Moines, Iowa, assignors to Chevron Research Company, San Francisco, Calif.
No Drawing. Continuation-in-part of abandoned application Ser. No. 92,303, Nov. 23, 1970. This application Oct. 5, 1972, Ser. No. 295,392
Int. Cl. A01n 9/12, 9/24
U.S. Cl. 424—286
4 Claims

ABSTRACT OF THE DISCLOSURE

A composition of sodium methyl dithiocarbamate and propionic acid can be used for preserving moist grain during storage.

CROSS-REFERENCE TO RELATED APPLICATIONS

This application is a continuation-in-part of copending U.S. Ser. No. 92,303, filed Nov. 23, 1970, now abandoned.

BACKGROUND OF THE INVENTION

Field

This invention relates to methods and compositions for preserving moist grain during storage. More particularly, it relates to preserving moist grain by applying a chemical composition prepared by mixing sodium methyl dithiocarbamate and propionic acid to the moist grain.

Prior Art

Freshly harvested moist grain (usually 20–30% by weight moisture) is a rich environment for microbiological growth—especially in warm weather. Several methods are or have been used to preserve such grain during storage. A common method is to dry the grain to below about 15% by weight moisture and store it in substantially moisture-free containers. Other physical treatments, such as refrigeration, and storage techniques, e.g., sealing the grain in oxygen-free containers, have been used or suggested in the past.

Additionally, there have been a variety of chemical treatments used or proposed for preserving high moisture grain. Large numbers of compounds have been tested for such use. See Cereal Chem., 28:196–207 (1951); Plant Physiol, 24:2, pp. 241–254 (1949); Can. J. Research, 16C, 241–247 (1938); Grain Science, 104:463–464 (1948); Ind. Eng. Chem., 7, 709–712 (1915); Yearbook of Agriculture, U.S.D.A., 1950–51; and U.S. Pat. No. 2,584,972.

Chemical treatments are advantageous over drying in that they may be readily carried out by the farmer at the harvest location without a large equipment investment. In this respect many farmers presently transport their freshly harvested grain to large independently operated dryers. Additionally, the grain does not have to be remoistened for feeding purposes when chemical treatment is employed. Also, special containers do not have to be used and the preservation is effective after the grain is removed from storage.

Since grain may be used primarily as an animal feed, it is desirable, if not imperative, that the chemical used to treat the grain not leave toxic or potentially toxic residues on the grain. Because of this many excellent agricultural fungicides—while highly effective—are not considered practical for grain storage. Consequently, the agricultural industry has looked mainly at relatively innocuous materials which leave no such residues. Currently, propionic acid is being promoted for this use. It is highly effective, relatively inexpensive, allegedly non-toxic and fairly easy to handle and apply. See "Studies on Feed Spoilage," L. R. Richardson and J. V. Halick, Texas Agr. Expt. Stat. Bull., 879 (1957) and British Pat. No. 1,155,485.

The art (U.S. Pat. No. 2,792,327) also teaches that sodium methyl dithiocarbamate may be used for controlling plant fungi.

SUMMARY OF THE INVENTION

It has now been surprisingly discovered that a composition prepared by mixing sodium methyl dithiocarbamate and propionic acid is significantly better in preserving moist grain during storage than either compound alone, particularly when at least 0.2 ounce (weight) of sodium methyl dithiocarbamate and 1.6 ounces (weight) of acid per bushel of moist grain are used.

DESCRIPTION OF THE INVENTION

The sodium methyl dithiocarbamate may be represented by the formula

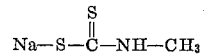

The compound is a white crystalline solid readily soluble in water. Technical solid sodium methyl dithiocarbamate exists in the dehydrate form. The compound is commercially available as an aqueous solution under the trademark "Vapam."

The composition of sodium methyl dithiocarbamate and propionic acid may be prepared by simply mixing the crystalline carbamate with the liquid acid. Alternately aqueous solutions of the carbamate may be prepared and admixed with the propionic acid. Further dilution with water may be accomplished if desired. The weight ratio of propionic acid to carbamate will usually be in the range from about 2:1 to 20:1, preferably from about 4:1 to 12:1. Mixing should preferably occur shortly before application on the grain.

The sodium methyl dithiocarbamate decomposes in dilute aqueous solutions as well as in acid solutions. Thus the composition prepared by mixing the alkanoic acid and the sodium methyl dithiocarbamate is difficult to describe in terms of exact components since decomposition and interaction may occur between the acid and carbamate on mixing. Thus, it is understood that the composition of the present invention is that composition which results when propionic acid and sodium methyl dithiocarbamate are admixed with each other.

The dosage level at which the composition of propionic acid and sodium methyl dithiocarbamate will be applied to the grain will depend upon the type of grain, its moisture content, the temperature and the period over which preservation is desired. Generally from 1.8 to 20 ounces (weight) of the composition per bushel of grain (i.e. 48 g. to 570 g. of composition per bushel of grain) will be satisfactory, although from about 1.8 to 4.8 ounces of composition per bushel of grain is preferred. The composition may be diluted with water to provide greater volume for application to the grain. Higher dosages may be used but do not afford additional protection. Preferably the dosage will be the minimum which will effectively preserve the grain for the desired length of time. In the above-mentioned range adequate protection will in most instances be provided for a period of 6 to 12 months or longer. It is preferred that at least about 1.6 ounces of acid per bushel and at least 0.2 ounce per bushel of the carbamate be used. More preferably, from about 1.6 to 4 ounces of acid per bushel and from about 0.2 to 0.8 ounce per bushel of sodium methyl dithiocarbamate should be used. Using such amounts results in unexpected increases in preservation activity as compared to the sum of the activities of the compounds used alone as will be seen from the example hereinafter described.

The method of this invention may be applied to any high moisture grain which is susceptible to attack by microbiological organisms such as fungi, moulds, yeasts and bacteria. Such grain includes flax, wheat, barley, corn, oats, rye and rice.

The particular organisms which are controlled by the treatments of this invention will depend upon the grain and its environment. The control will conventionally encompass a spectrum of organisms including moulds and fungi such as *Penicillium, Rhizopus, Aspergillus, Fusarium, Helminthosporium, Nigrospora* and *Alternaria* species, yeasts, e.g., the *candidus* species and bacteria such as the *subtilis* and *acrobacterium* species.

The compositions which are used in this invention are normally liquid and may be aplied with available liquid sprayers and dispersers. Dispersing equipment should be chosen which provides a uniform application of the composition to the grain. If the grain is not uniformly treated, pockets of untreated grain may become contaminated with microorganisms. Such contamination if heavy enough may spread to surrounding grain. Representative apparatus which may be so used includes that which is presently used to treat seeds with liquids. Alternatively, these compositions may be applied using a spray unit positioned at the base of an auger. As the grain is fed onto the auger a monitored amount of the composition is sprayed onto the grain. The grain is conveyed into the silo, bin or other container. While it is not necessary that the treated grain be kept in sealed containers, it is desirable to keep it in topped containers.

The compositions of this invention may also contain conventional wetting and dispersing agents and/or diluents to facilitate their uniform application to the grain.

EXAMPLE

The following example illustrates the exceptional preservation activity of the composition of this invention. The example is intended to illustrate the invention and is not considered restrictive of the invention as otherwise described herein. Indicated ratios and percentages are by weight unless otherwise indicated.

A mixture of propionic acid (99%) and aqueous sodium methyl dithiocarbamate was applied to corn of 24–25 weight percent moisture at various dosages. These mixtures were applied to the corn in a mixer for one minute at 32 r.p.m. Seven inch ventilated cans equal to ⅓ bushel were filled with this treated corn. The cans were held at 68–73° F. Temperature readings were taken semi-weekly at the center of the can. When the temperature exceeded constant room temperature for at least an 8-hour period, and visible fungi were observed growing on the corn, the treatment was considered broken. The duration of corn preservation in weeks was recorded.

Also, for comparison purposes, propionic acid and sodium methyl dithiocarbamate were applied individually to corn of 24–25 weight percent moisture at various dosages using the method described above for the mixture of the two chemicals.

The results of the tests are reported in Table I. The "Duration of Control" is the period measured in weeks over which the temperature in the center of the cans did not exceed constant room temperature for at least an 8-hour period, and fungi were not observed growing on the corn. Thus, the "Duration of Control" can be considered as the effective time that the chemical treatment prevented the corn from undergoing microbial, thermochemical and/or enzymatic breakdown. The several numbers for each particular rate of application of chemical indicate the results from several tests.

TABLE

| Run number | Propionic acid (rate oz. active/Bu) | Carbamate (rate oz. active/Bu) | Ratio propionic acid/carbamate | Duration of control (weeks) |
|---|---|---|---|---|
| 1 | 1.6 | | | 1,1,2 |
| 2 | 2.0 | | | 2 |
| 3 | 2.4 | | | 1 |
| 4 | 3.0 | | | 3 |
| 5 | 3.2 | | | 3,4 |
| 6 | 3.5 | | | 4 |
| 7 | 4.0 | | | 4,11 |
| 8 | | 0.2 | | 1,1,1 |
| 9 | | 0.4 | | 3,1 |
| 10 | | 0.8 | | 6,4,4 |
| 11 | 1.6 | 0.2 | 8:1 | 7,8,14,17 |
| 12 | 1.6 | 0.4 | 4:1 | 21 |
| 13 | 2.4 | 0.2 | 12:1 | 25 |
| 14 | 2.4 | 0.4 | 6:1 | 23 |
| 15 | 4.0 | 0.2 | 20:1 | 21 |

It is evident that when the rate of application of a mixture of propionic acid and sodium methyl dithiocarbamate is such that the amount of propionic acid is at least about 1.6 oz./bu. and the carbamate is at least about 0.2 oz./bu., and the weight ratio of propionic acid to dithiocarbamate is about 4:1 to 20:1, a synergistic effect results. Thus, at the higher concentrations of mixtures of the two chemicals the duration of control is significantly and unexpectedly higher than would be aparent from considering the effective control which each chemical individually exhibits.

As will be evident to those skilled in the art, various modifications of this invention can be made or followed in the light of the foregoing disclosure and discussion without departing from the spirit or scope of the disclosure or from the scope of the following claims.

What is claimed is:

1. A method for preserving moist grain against attack by bacteria and fungi during storage which comprises applying thereto a mixture of propionic acid and sodium methyl dithiocarbamate, wherein the weight ratio of propionic acid to dithiocarbamate is from about 4:1 to 20:1, the amount of propionic acid is at least 1.6 ounces per bushel of grain, the amount of dithiocarbamate is at least 0.2 ounces per bushel of grain, and the amount of the mixture is from about 1.8 to 4.8 ounces per bushel of grain.

2. The method of Claim 1 wherein the grain is flax, wheat, barley, corn, sorghum, oats, rye or rice.

3. The method of Claim 2 wherein the grain is corn.

4. The method of Claim 2 wherein the weight ratio of propionic acid to sodium methyl dithiocarbamate is from about 4:1 to 8:1.

References Cited

UNITED STATES PATENTS 2,792,327   5/1957   Hunt _____ 424—300
2,584,972   2/1952   Altschul et al. _____ 99—153

FOREIGN PATENTS 1,155,485   6/1969   Great Britain.

ALBERT T. MEYERS, Primary Examiner
L. SCHENKMAN, Assistant Examiner

U.S. Cl. X.R.
424—317